US011858258B2

(12) United States Patent
Horie et al.

(10) Patent No.: US 11,858,258 B2
(45) Date of Patent: Jan. 2, 2024

(54) WORK SYSTEM AND RECORDING APPARATUS

(71) Applicant: SEIKO EPSON CORPORATION, Tokyo (JP)

(72) Inventors: Seijun Horie, Matsumoto (JP); Kiyoto Komuro, Okaya (JP); Hirokazu Fujii, Shiojiri (JP); Takumi Otsu, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/454,386

(22) Filed: Nov. 10, 2021

(65) Prior Publication Data

US 2022/0153039 A1 May 19, 2022

(30) Foreign Application Priority Data

Nov. 13, 2020 (JP) ................................ 2020-189259

(51) Int. Cl.
*B41J 11/00* (2006.01)

(52) U.S. Cl.
CPC .................................. *B41J 11/007* (2013.01)

(58) Field of Classification Search
CPC ........ B41J 11/007; B41J 3/4078; B41J 29/02; B41J 15/048; B41J 29/17; B41J 29/377; B41J 29/38; B41J 29/13; B41J 11/0005; B41J 29/12
See application file for complete search history.

(56) References Cited

U.S. PATENT DOCUMENTS

2008/0267666 A1* 10/2008 Shirokoshi ............... B41J 29/13
399/222
2018/0345698 A1* 12/2018 Tanabe ..................... B41J 29/10

FOREIGN PATENT DOCUMENTS

JP 2009-154483 A 7/2009

* cited by examiner

*Primary Examiner* — Jannelle M Lebron
(74) *Attorney, Agent, or Firm* — WORKMAN NYDEGGER

(57) ABSTRACT

A work system includes a recording apparatus including a transport belt that is provided with an adhesive configured for attachment of a medium, and is configured to transport the medium, and a main body portion in which a recording portion configured to perform recording on the medium is accommodated, a cover that covers at least a part of an exposed part of the transport belt exposed from the main body portion, and a removing portion configured to remove gas in a space covered with the cover.

15 Claims, 8 Drawing Sheets

WORK SYSTEM AND RECORDING APPARATUS

The present application is based on, and claims priority from JP Application Serial Number 2020-189259, filed Nov. 13, 2020, the disclosure of which is hereby incorporated by reference herein in its entirety.

BACKGROUND

1. Technical Field

The present disclosure relates to a work system and a recording apparatus.

2. Related Art

In the related art, as illustrated in JP-A-2009-154483, a printer apparatus including a printing portion and an endless transport belt in which an adhesive layer is formed on a surface thereof has been disclosed.

In JP-A-2009-154483, it is disclosed that a peeling solvent for peeling a fixing agent (adhesive) constituting the adhesive layer of the belt is applied on the surface of the transport belt, and then, a new fixing agent is applied to form the adhesive layer.

This work replaces the fixing agent and restores adhesive strength of the fixing agent.

However, the fixing agent and the peeing solvent may include a volatile organic compound (VOC).

In this case, there is a possibility that an evaporated VOC is diffused around when the fixing agent is replaced.

SUMMARY

A work system includes a recording apparatus including a transport belt that is provided with an adhesive configured for attachment of a medium, and is configured to transport the medium, and a main body portion in which a recording portion configured to perform recording on the medium is accommodated, a cover that covers at least a part of an exposed part of the transport belt exposed from the main body portion, and a removing portion configured to remove gas in a space covered with the cover.

A recording apparatus includes a transport belt that is provided with an adhesive configured for attachment of a medium, and is configured to transport the medium, a main body portion in which a recording portion configured to perform recording on the medium is accommodated, a cover that covers at least a part of an exposed part of the transport belt exposed from the main body portion, and a removing portion configured to remove gas in a space covered with the cover.

DESCRIPTION OF EXEMPLARY EMBODIMENTS

1. First Embodiment

First, a configuration of a recording apparatus 10 constituting a work system 1 will be described.

The recording apparatus 10 is a printer that can perform recording on a medium M (for example, fabric or paper).

In each drawing below, a direction along an X axis indicates a width direction of the recording apparatus 10.

A direction along a Y axis indicates a depth direction of the recording apparatus 10.

A direction along a Z axis indicates a height direction of the recording apparatus 10.

Figure 1:
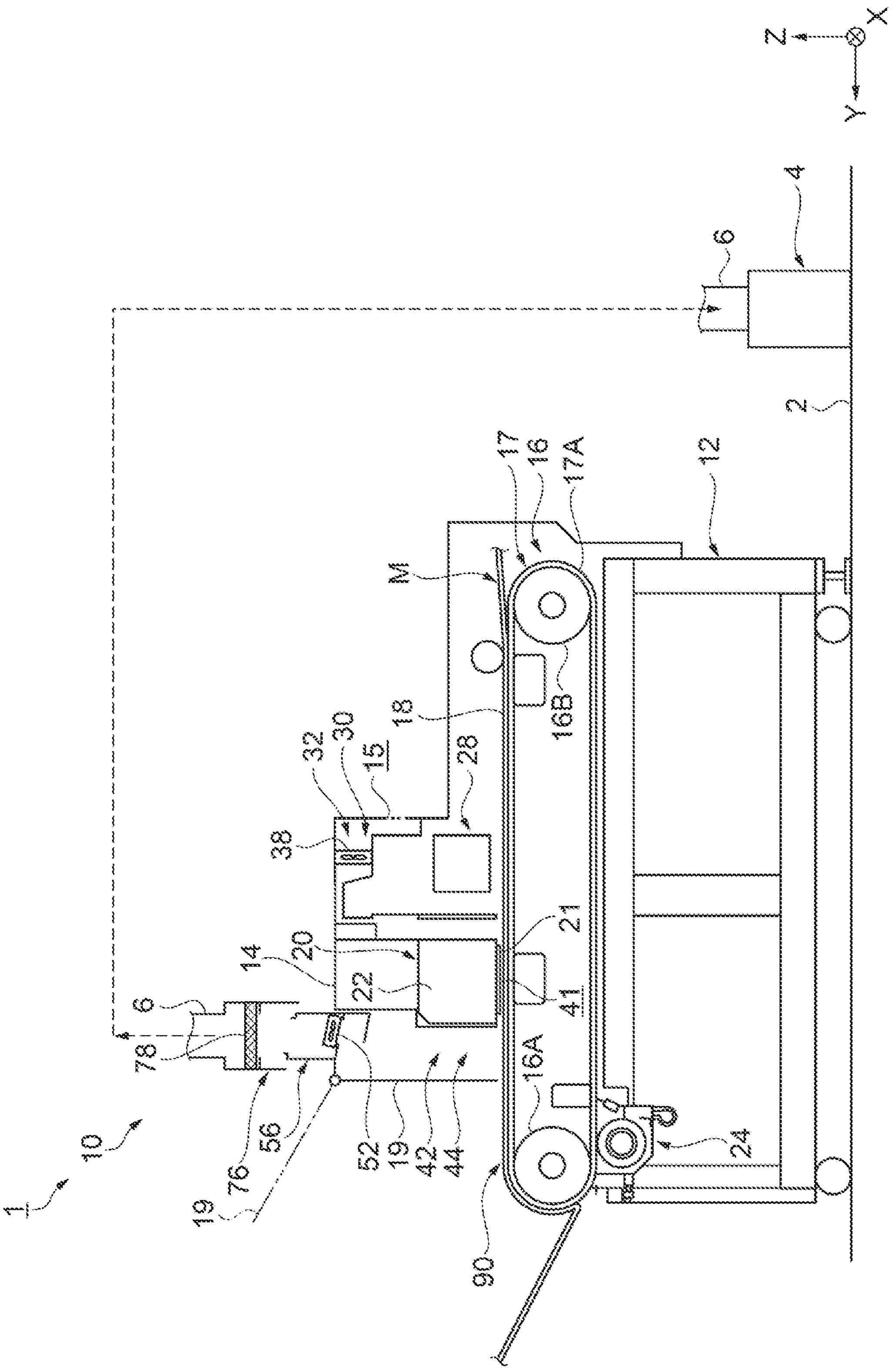
FIG. 1 is a schematic view illustrating a configuration of a recording apparatus according to a first embodiment.

FIG. 1 illustrates a configuration of the recording apparatus 10 installed on an installation surface 2 of a floor portion of a factory that is one example of an installation location.

An exhaust apparatus 4 as one example of an exhaust facility is installed on the installation surface 2.

The exhaust apparatus 4 may be disposed on a ceiling portion, not illustrated, of the factory.

The exhaust apparatus 4 includes an exhaust fan, not illustrated, and is coupled to an exhaust duct 6 of the recording apparatus 10.

Exhaust from the recording apparatus 10 is collected and purified by the exhaust apparatus 4 through the exhaust duct 6 and is released outside the factory from the exhaust apparatus 4.

The recording apparatus 10 includes a main body frame 12, a casing 14 (main body portion), a transport unit 16, a recording portion 20, a cleaning unit 24, a control unit 28, and a flow channel portion 30.

The main body frame 12 is configured as a base portion in which each portion of the recording apparatus 10 is disposed.

The casing 14 is an exterior member that covers each portion of the recording apparatus 10.

The main body frame 12 and the casing 14 are members including a magnetic body.

For example, the casing 14 accommodates the recording portion 20.

A casing cover 19 that can be open and closed is disposed in a +Y direction end portion of the casing 14.

The casing cover 19 is a part of the casing 14.

The casing cover 19 is positioned above a transport belt 17 (glue belt).

The casing cover 19 extends in the direction along the X axis.

A width dimension of the casing cover 19 in the direction along the X axis is slightly greater than a width dimension of the transport belt 17 in the direction along the X axis.

The casing cover 19 pivots between a closed state and an open state about a shaft disposed in the direction along the X axis.

When the casing cover 19 is in the closed state, the casing cover 19 is in the direction along the Z axis in side view.

When the casing cover 19 is in the open state, the casing cover 19 is positioned to be directed further above from a horizontal direction in side view.

A damper, not illustrated, is disposed in the casing cover 19, and the casing cover 19 can be held in the open state.

The casing cover 19 is set to the closed state during a recording process of the recording apparatus 10. The casing cover 19 is set to the open state in a maintenance work, described later, for the transport belt 17.

The transport unit 16 includes a drive roller 16A, a passive roller 16B, the transport belt 17, and a winding roller, not illustrated.

The transport unit 16 can transport the medium M in a +Y direction in accordance with movement of the transport belt 17 by rotation of the drive roller 16A.

The drive roller 16A is arranged downstream in a transport direction, and the passive roller 16B is arranged upstream in the transport direction.

In addition, both the drive roller 16A and the passive roller 16B include a rotation shaft in the direction along the X axis.

Rotation of the drive roller 16A is controlled by the control unit 28.

The transport belt 17 is configured with an endless belt obtained by joining both ends of a planar plate having elasticity.

In addition, the transport belt 17 is wound around an outer circumferential surface of the drive roller 16A and an outer circumferential surface of the passive roller 16B, and the transport belt 17 can move in a circular manner.

An adhesive to which the medium M can be attached is disposed on an outer circumferential surface 17A of the transport belt 17.

The medium M is supported on the transport belt 17 in a state where the medium M is attached to the adhesive.

The medium M is peeled from the adhesive and collected by a winding apparatus, not illustrated.

On the outer circumferential surface 17A, a planar part positioned in a +Z direction between the drive roller 16A and the passive roller 16B is a support surface 18 that supports the medium M.

In addition, the transport belt 17 of this embodiment includes an exposed part 90 in which a part of the transport belt 17 is exposed from the casing 14.

Specifically, the transport belt 17 protrudes in the +Y direction from the casing 14 (casing cover 19 in the closed state).

The protruding part corresponds to the exposed part 90.

Since the transport belt 17 protrudes from the casing 14, a finger of a user is unlikely to intrude into the casing 14 during the maintenance work, described later, for the transport belt 17, for example, during a work in which the user peels off the adhesive on the transport belt 17 or applies the adhesive. Workability can be improved.

The recording portion 20 performs recording on the transported medium M.

Specifically, the recording portion 20 includes a recording head 21 that ejects liquid (for example, ink) as a liquid droplet, and a carriage 22 that supports the recording head 21 and reciprocates in the direction along the X axis.

The recording portion 20 is arranged to face the support surface 18 above the transport belt 17 (+Z direction).

Recording on the medium M can be performed by causing the recording head 21 to eject the liquid droplet to the transported medium M while moving in the direction along the X axis.

The cleaning unit 24 is positioned downstream of the drive roller 16A in a direction in which the transport belt 17 moves in a circular manner, and cleans the outer circumferential surface 17A.

The control unit 28 is configured to include a central processing unit (CPU), a read only memory (ROM), a random access memory (RAM), and a storage and controls an operation of each portion of the recording apparatus 10.

The flow channel portion 30 is a part, inside the casing 14, that includes a space 41 and functions as a flow channel through which air is forced to flow.

In addition, the flow channel portion 30 includes a feeding portion 32 and a suction portion 42.

The feeding portion 32 is disposed on the −Y direction side (upstream) of the recording portion 20.

The feeding portion 32 includes a first fan 38, takes in air through an intake port 15, and feeds air toward the support surface 18.

The suction portion 42 is disposed on the +Y direction side (downstream) of the recording portion 20 and suctions air flowing from the support surface 18.

Specifically, the suction portion 42 includes a circulation portion 44 and a second fan 52.

The circulation portion 44 includes a first duct 56 and a second duct 76 arranged above the first duct 56.

The second duct 76 is coupled to the exhaust duct 6.

The second fan 52 is disposed inside the first duct 56.

The second fan 52 suctions air in the circulation portion 44.

The air suctioned by the second fan 52 is discharged from the exhaust duct 6 through the first duct 56 and the second duct 76.

A filter 78 is arranged inside the second duct 76.

The filter 78 can capture a foreign object such as mist mixed in the air.

Non-woven fabric, glass wool, or mineral wool can be used as the filter 78.

Next, the maintenance work for the transport belt 17 will be described.

For example, the maintenance work for the transport belt 17 is a work of replacing the adhesive of the transport belt 17.

Specifically, when the medium M is attached to the transport belt 17, and the recording process is performed while the medium M is transported, for example, ink, lint, or dust clings to the adhesive disposed in the transport belt 17.

Thus, adhesive strength of the adhesive is gradually decreased, and the medium M is not transported in a state where the medium M is sufficiently attached to the transport belt 17.

In such a case, an adhesive layer is formed on the transport belt 17 by removing the adhesive disposed on the outer circumferential surface 17A of the transport belt 17 and applying a new adhesive.

Accordingly, the adhesive strength for the medium M is restored.

When the recording apparatus 10 is newly installed in the factory, the maintenance work related to such a work of applying the adhesive is also performed on the new transport belt 17 in the same manner.

Here, in the maintenance work, a solvent for removing the adhesive of the transport belt 17 or the adhesive may include a volatile organic compound (VOC).

In such a case, there is a possibility that an evaporated VOC is diffused around.

Furthermore, there is a possibility that the VOC diffused around exerts a chemical action on various mechanical elements or electric parts constituting the recording apparatus 10 and consequently, affect an operation of the recording apparatus 10.

Therefore, in this embodiment, the work system 1 that suppresses diffusion of the evaporated VOC in the maintenance work is configured.

Hereinafter, a configuration of the work system 1 will be described.

Figure 2:
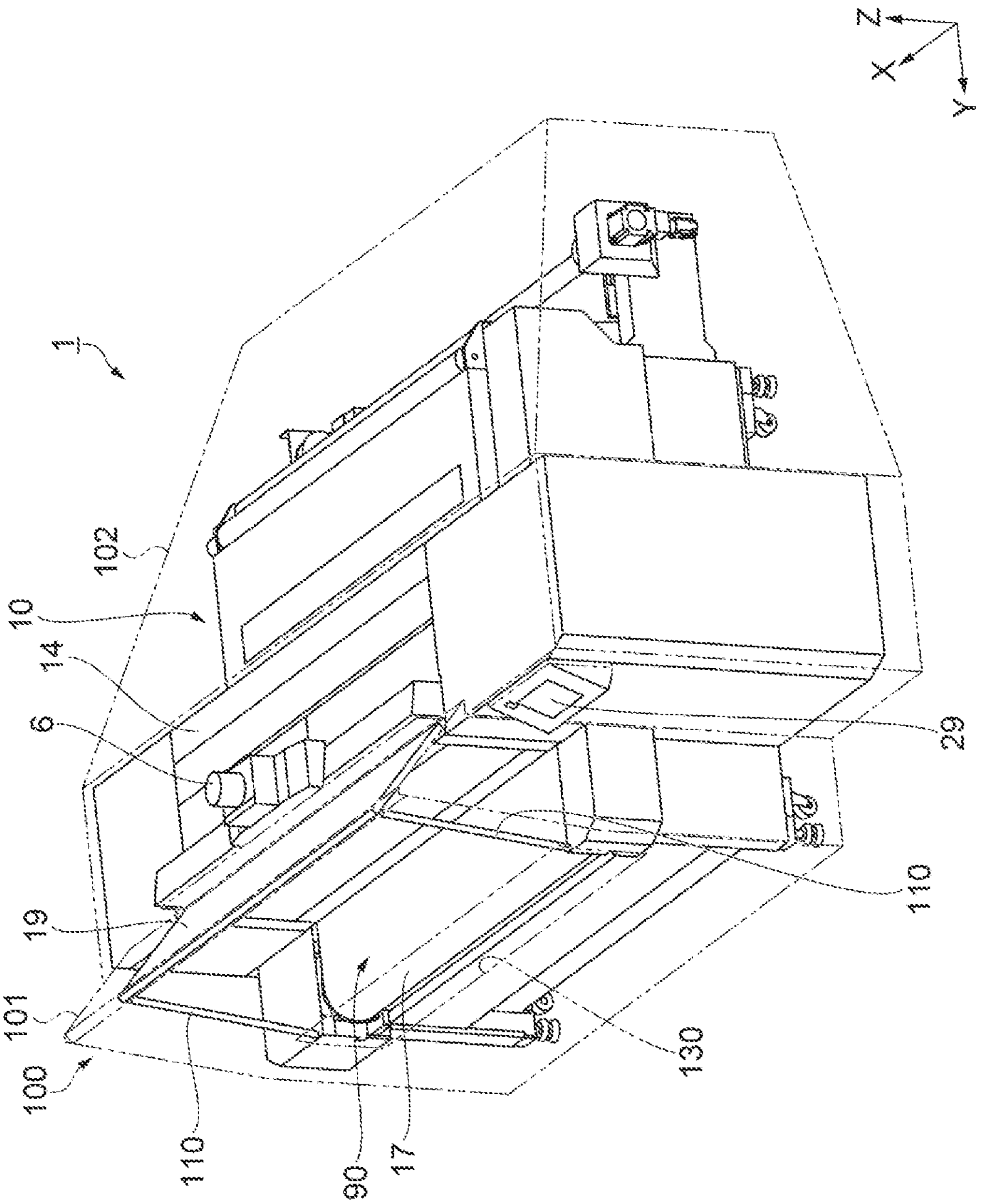
FIG. 2 is a perspective view illustrating a configuration of a work system according to the first embodiment.
Figure 3:
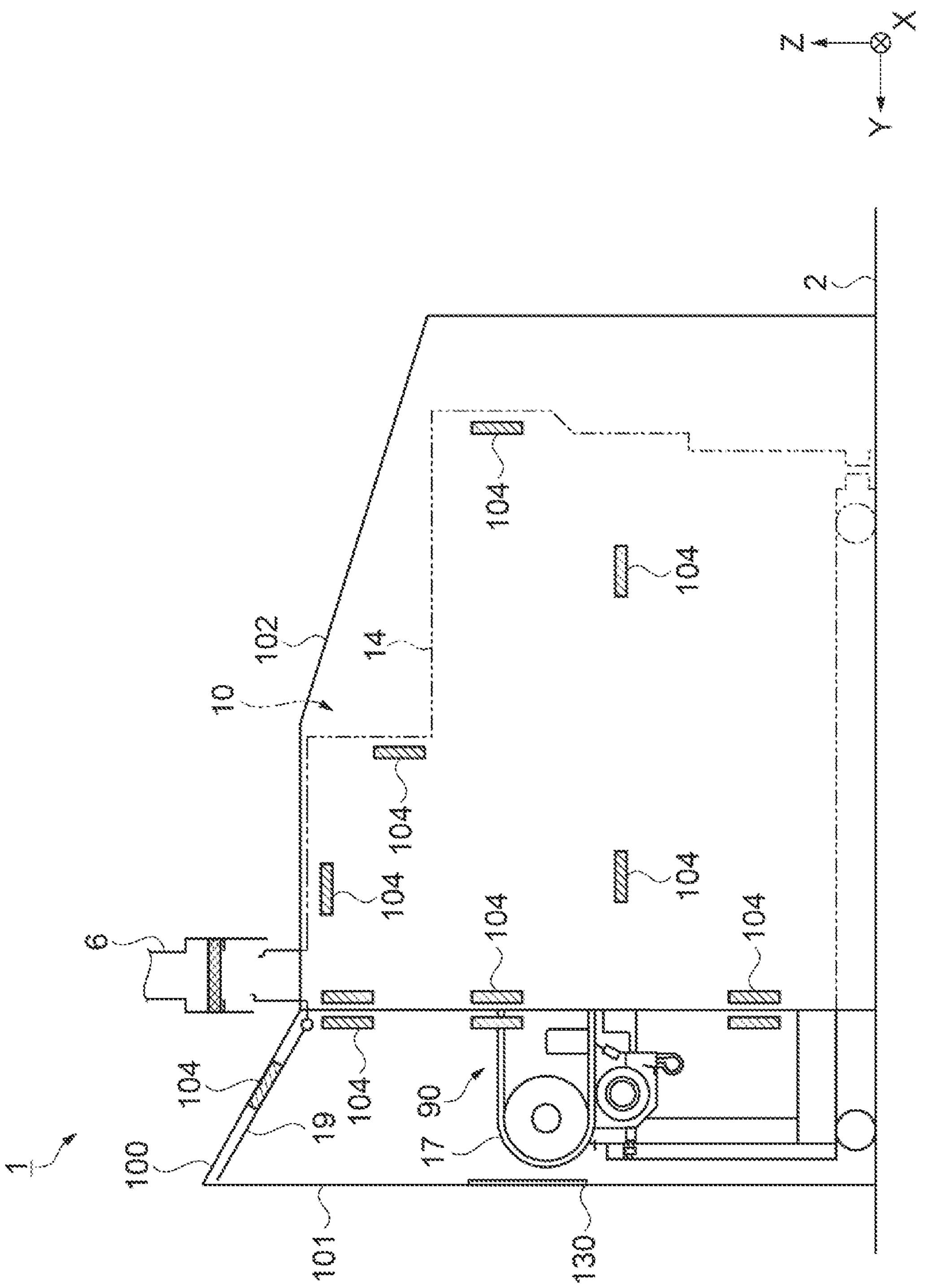
FIG. 3 is a side view illustrating the configuration of the work system according to the first embodiment.
Figure 4:
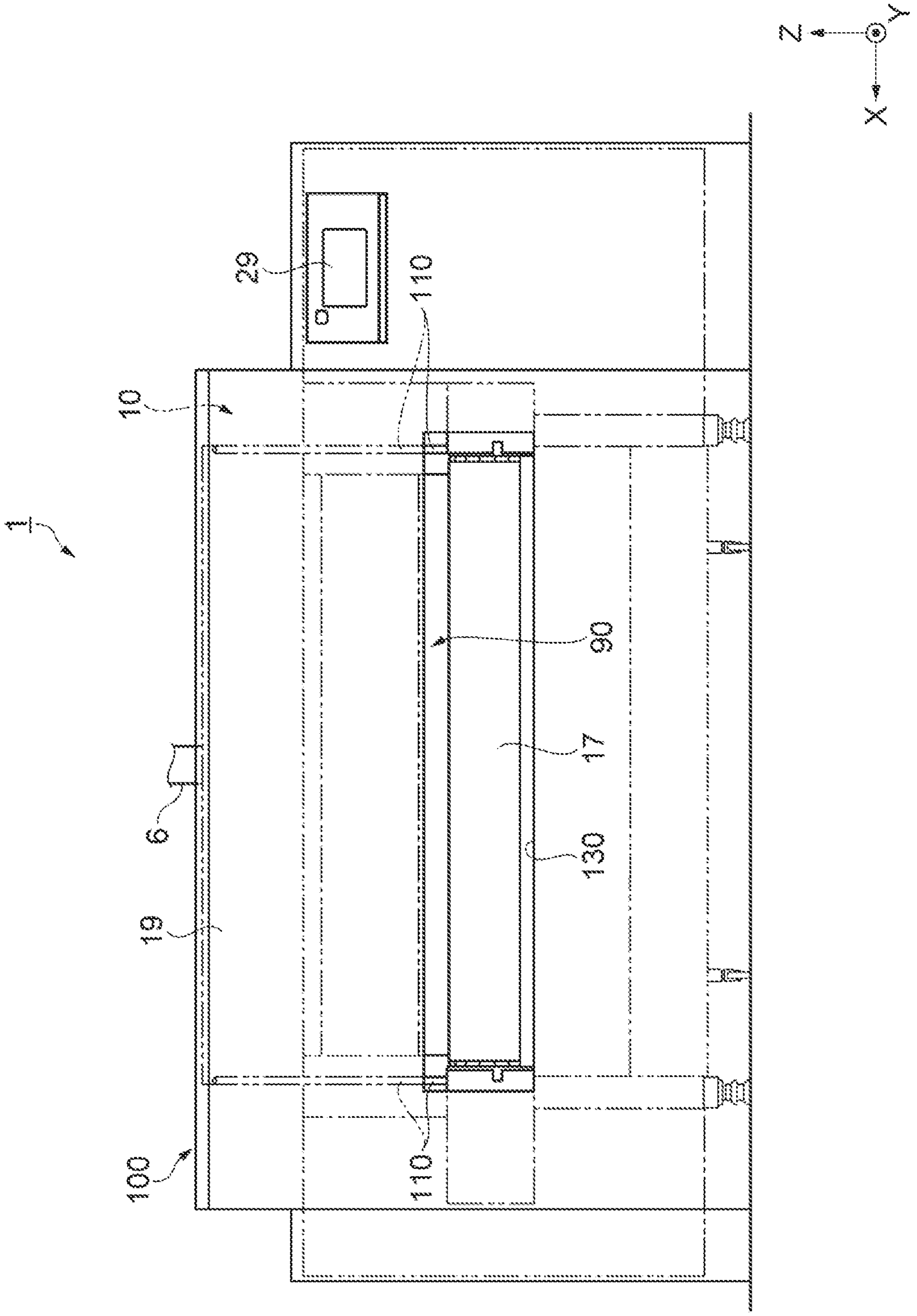
FIG. 4 is a front view illustrating the configuration of the work system according to the first embodiment.

As illustrated in FIG. 2, FIG. 3, and FIG. 4, the work system 1 includes the recording apparatus 10, a cover 100, and a removing portion.

The configuration of the recording apparatus 10 is described above.

In FIG. 2, the recording apparatus 10 is illustrated by solid line, and the cover 100 is illustrated by chain double-dashed line.

In FIG. 3 and FIG. 4, a part of the recording apparatus 10 is illustrated by chain double-dashed line, and the cover 100 is illustrated by solid line.

The cover 100 is installed in the maintenance work for the transport belt 17.

The cover 100 covers at least a part of the exposed part 90 exposed from the casing 14 in the transport belt 17 disposed in the recording apparatus 10.

In addition, the removing portion of this embodiment is the second fan 52 (refer to FIG. 1) and suctions gas in a space covered with the cover 100.

The suctioned gas is released outside the factory through the exhaust duct 6.

Accordingly, the gas, for example, the VOC, in the space covered with the cover 100 is removed.

That is, diffusion of the evaporated VOC can be suppressed.

Covering at least a part of the exposed part 90 of the transport belt 17 with the cover 100 indicates that a region in which the exposed part 90 of the transport belt 17 overlaps with the cover 100 is present in plan view, side view (FIG. 3), or front view (FIG. 4).

In this embodiment, the entire exposed part 90 of the transport belt 17 overlaps with the cover 100 in plan view and side view.

That is, the exposed part 90 is covered with the cover 100 in plan view and side view.

Meanwhile, in front view, an opening 130 is disposed in the cover 100, and the cover 100 does not overlap with the transport belt 17 in a width direction and a height direction of the transport belt 17 through the opening 130.

That is, the opening 130 is formed to enable the user to directly view the transport belt 17 in front view.

Accordingly, the transport belt 17 can be directly accessed through the opening 130, and the maintenance work for the transport belt 17 is easily performed.

The space covered with the cover 100 refers to a space, around the exposed part 90, that is closed with the cover 100, assuming that the opening 130 is closed.

The cover 100 of this embodiment includes a first cover 101 and a second cover 102.

The first cover 101 is arranged from the casing cover 19 to be approximately centered at a part (exposed part 90) in which the transport belt 17 in the +Y direction protrudes.

The second cover 102 is arranged from the casing cover 19 to be approximately centered at a part of the casing 14 in the −Y direction.

The first cover 101 is installed with the casing cover 19 set to the open state.

Specifically, the first cover 101 is installed in a state where the first cover 101 is hung down to a lower portion of the recording apparatus 10 from an upper surface of the casing cover 19 in the open state.

A lower end portion of the first cover 101 is approximately in contact with the installation surface 2.

Accordingly, leakage of gas from the lower portion of the recording apparatus 10 can be suppressed.

The first cover 101 may be installed such that a part in which an operation panel portion 29 is arranged is exposed.

In this embodiment, a plurality of frames 110 that are disposed at intervals to each other are disposed.

The frames 110 are formed of an anti-static material.

In this embodiment, two rod-shaped frames 110 are disposed.

Specifically, one frame 110 is disposed between the casing cover 19 and a part of the casing 14 positioned in a +X direction of the transport belt 17.

The other frame 110 is disposed between the casing cover 19 and a part of the casing 14 positioned in a −X direction of the transport belt 17.

These frames 110 support the casing cover 19.

Accordingly, the open state of the casing cover 19 can be securely held.

A +Y direction end portion of the casing cover 19 in the open state is positioned slightly further in the +Y direction than the transport belt 17 and the main body frame 12.

That is, the first cover 101 is installed in a state where a +Y direction end portion of the first cover 101 is hung down near a +Y direction end portion of the transport belt 17.

Accordingly, the first cover 101 can cover around the exposed part 90 of the transport belt 17 with the minimum size.

Accordingly, efficiency of removing gas in a space covered with the first cover 101 can be increased, and ventilation efficiency can be increased.

Furthermore, by setting the casing cover 19 to the open state, a region between the exposed part 90 and the second fan 52 is increased, compared to when the casing cover 19 is in the closed state. Thus, exhaust efficiency of the gas in the space covered with the first cover 101 can be further increased.

The first cover 101 is formed of an anti-static material.

Accordingly, static electrification can be prevented, and electric discharge can be prevented.

For example, a fabric material or a vinyl material is used in the first cover 101.

Particularly, a thin vinyl material that transmits light is preferred for the first cover 101.

Accordingly, the transport belt 17 can be visually recognized through the first cover 101, and work efficiency can be increased.

The first cover 101 is detachably attached to the recording apparatus 10.

The first cover 101 is fixed to the casing 14 or the main body frame 12 by at least one fixing portion 104.

For example, the fixing portion 104 is a sheet-shaped magnet that can be freely deformed.

In this embodiment, a plurality of the fixing portions 104 (magnets) are disposed in a plurality of locations in the first cover 101 and stick to the casing 14 or the main body frame 12 including a magnetic body.

Accordingly, for example, deviation of the first cover 101 from the casing 14 or the main body frame 12 when the second fan 52 performs suctioning is suppressed, and the space covered with the first cover 101 can be held.

In addition, the fixing portions 104 (magnets) can be easily detached from the casing 14 with the finger.

Accordingly, when the maintenance work for the transport belt 17 is not performed, for example, detaching the first cover 101 from the casing 14 can suppress hindrance to a work in which the user accesses the exposed part 90 and sets the medium M.

The fixing portions 104 may fix the first cover 101 to the casing 14 or the main body frame 12 using, for example, a surface fastener.

In the same manner, the second cover 102 is detachably attached to the recording apparatus 10 and is installed in a state where the second cover 102 is hung down to the lower portion of the recording apparatus 10 from an upper portion of the casing 14 excluding the exhaust duct 6.

The second cover 102 is also fixed to the casing 14 or the main body frame 12 by the fixing portions 104 (for example, magnets).

In this embodiment, an opening portion is disposed in a +Y direction end portion of the casing 14, and a part of the transport belt 17 is open from the casing 14.

Thus, by covering including a −Y direction end portion of the recording apparatus 10 with the second cover 102, for example, diffusion of the VOC generated from the adhesive of the transport belt 17 is suppressed.

An anti-static material is used in the second cover 102 in the same manner as the first cover 101.

The fixing portions 104 are fixed such that a part of the first cover 101 overlaps with a part of the second cover 102.

Accordingly, a gap between the first cover 101 and the second cover 102 does not occur, and leakage of the VOC is suppressed.

The cover 100 may be formed as a single body.

According to this embodiment, by including the cover 100 (the first cover 101 and the second cover 102) that covers at least a part of the exposed part 90 of the transport belt 17, for example, a range in which the evaporated volatile organic compound (VOC) generated from a peeling agent or the adhesive is diffused around the recording apparatus 10 in the maintenance work for the transport belt 17 can be restricted.

By removing the gas in the space covered with the cover 100 using the second fan 52, the evaporated VOC can be removed.

Accordingly, a chemical action on the recording apparatus 10 is suppressed, and for example, an effect on the operation of the recording apparatus 10 can be suppressed.

The removing portion in the work system 1 is not limited to the second fan 52.

For example, the removing portion may be the exhaust apparatus 4 installed in the factory.

In addition, the removing portion may be a wind blowing apparatus, or a porous material that absorbs or adsorbs the gas in the space covered with the cover 100 may be used in the removing portion.

In addition, while the cover 100 is formed of an anti-static material in this embodiment, the cover 100 is not limited thereto.

For example, a form of stretching the cover 100 over the plurality of frames 110 as a stretching member may be configured.

In this case, electrical conductivity of the frames 110 is greater than electrical conductivity of the cover 100, and the frames 110 are electrically coupled to the recording apparatus 10 directly or indirectly.

When the frames 110 are electrically coupled to the recording apparatus 10 indirectly, the frames 110 are coupled to the recording apparatus 10 through an electrically conductive member such as a wire.

The recording apparatus 10 is grounded.

Accordingly, electric potentials of the cover 100 and the frames 110 can be set to be approximately equal to an electric potential of the recording apparatus 10.

Accordingly, electric discharge caused by an electric potential difference between the electric potential of the frames 110 and the electric potential of the recording apparatus 10 is suppressed.

While the large opening 130 is disposed in the +Y direction end portion of the first cover 101 in this embodiment, the opening 130 is not limited thereto.

For example, a plurality of the openings 130 may be formed, and a total area of the openings 130 may be decreased.

Accordingly, an area covered with the first cover 101 is increased, and air intake efficiency in the space covered with the first cover 101 can be increased.

In addition, while the opening 130 is disposed in only the +Y direction end portion of the first cover 101 in this embodiment, for example, a plurality of openings may be additionally disposed in a +X direction end portion of the first cover 101 or a −X direction end portion of the first cover 101.

By doing so, the maintenance work can be performed by a plurality of persons.

2. Second Embodiment

Next, a second embodiment will be described.

Note that configurations identical to those in the first embodiment will be denoted by the same reference signs and redundant descriptions will be omitted.

Figure 5:
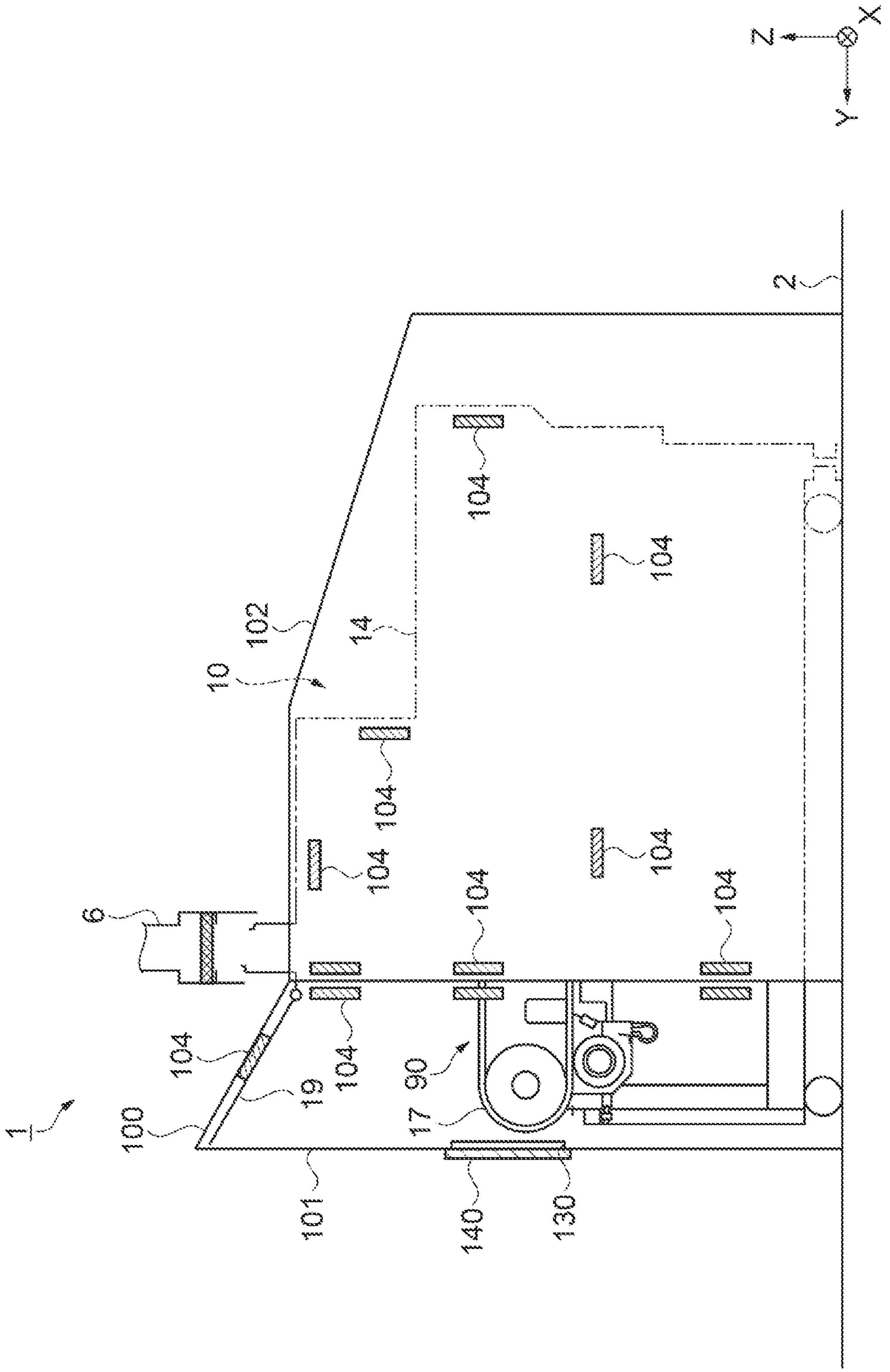
FIG. 5 is a side view illustrating a configuration of a work system according to a second embodiment.

While a form of disposing the opening 130 in the first cover 101 to expose the transport belt 17 in front view is used in the first embodiment, a lid portion 140 is disposed in the opening 130 of the first cover 101 in this embodiment as illustrated in FIG. 5.

The entire opening 130 is covered with the lid portion 140.

Accordingly, the exposed part 90 of the transport belt 17 is covered with the first cover 101 in all directions.

Accordingly, diffusion of the VOC outside the first cover 101 can be suppressed.

In FIG. 5, a part of the recording apparatus 10 is illustrated by chain double-dashed line, and the cover 100 is illustrated by solid line.

In addition, the lid portion 140 can be displaced to a position at which the space covered with the first cover 101 communicates with a space outside the first cover 101 through the opening 130.

Figure 6A:
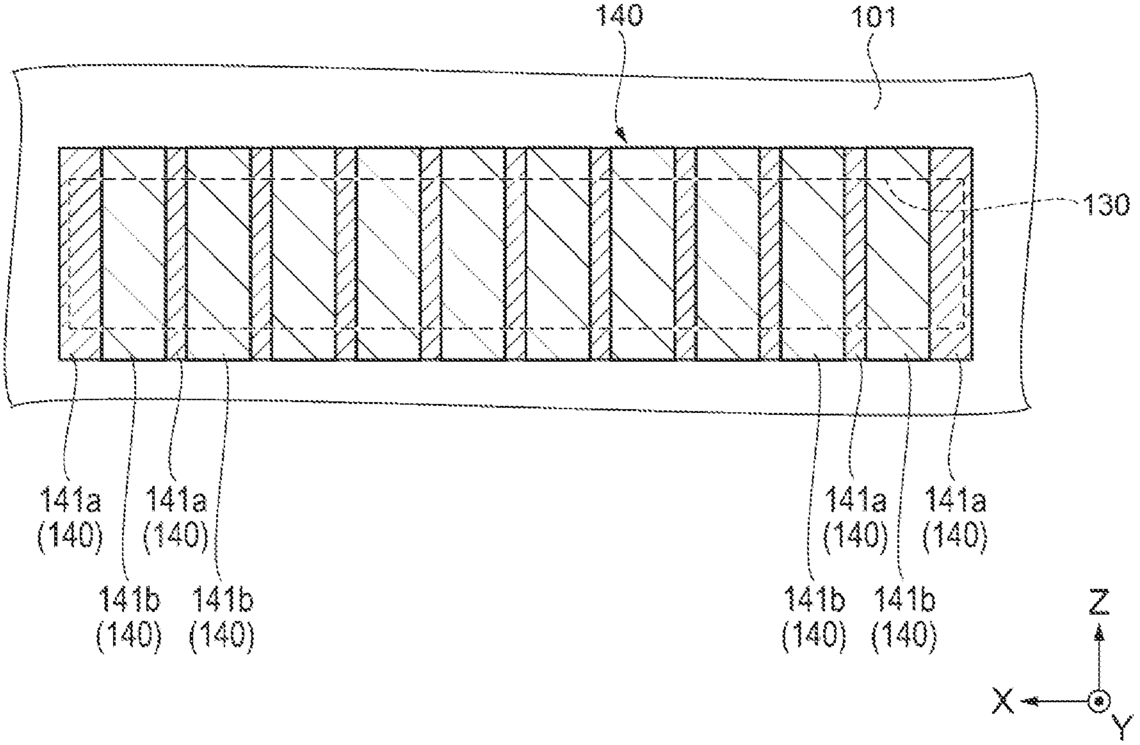
FIG. 6A is a schematic view illustrating a configuration of a lid portion according to the second embodiment.
Figure 6B:
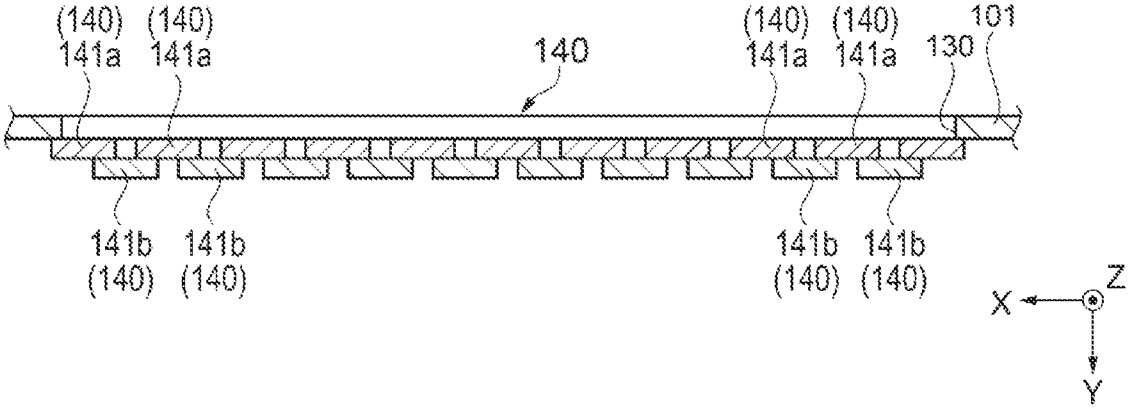
FIG. 6B is a schematic view illustrating the configuration of the lid portion according to the second embodiment.

Specifically, as illustrated in FIG. 6A and FIG. 6B, the lid portion 140 of this embodiment is configured with a plurality of rectangular members 141 (141*a* and 141*b*) having a rectangular shape.

The lid portion 140 of this embodiment is configured into a curtain shape by the rectangular members 141.

The rectangular members 141 (141*a* and 141*b*) are elastic members and, for example, are formed with rubber members that transmit light.

Here, +Z direction end portions and −Z direction end portions of the rectangular members 141*a* are fixed to the first cover 101.

Parts of the rectangular members 141*a* other than the parts fixed to the first cover 101 can be freely deformed.

Each rectangular member 141*a* is arranged at predetermined intervals in the direction along the X axis.

In addition, +Z direction end portions of the rectangular members 141*b* are fixed to the +Z direction end portions of the adjacent rectangular members 141*a*.

Similarly, −Z direction end portions of the rectangular members 141*b* are fixed to the −Z direction end portions of the adjacent rectangular members 141*a*.

That is, end portions of the rectangular members 141*a* in the X direction and end portions of the rectangular members 141*b* in the X direction are arranged to overlap with each other.

Accordingly, the opening 130 is closed with the lid portion 140 in front view.

Parts of the rectangular members 141*b* other than the fixed parts can be freely deformed.

The rectangular members 141 are formed of an anti-static material.

Accordingly, the rectangular members 141 can be easily deformed (displaced).

When the finger or an arm of the user enters toward the transport belt 17 from the lid portion 140, the lid portion 140 is easily deformed, and the space inside the first cover 101 communicates with the space outside the first cover 101.

The space covered with the first cover 101 can be easily accessed, and the work can be performed.

In addition, when the finger or the arm recedes from the lid portion 140, elasticity of the rectangular members 141 causes the shapes of the rectangular members 141 to return to a state before the finger or the arm enters.

Accordingly, when the user does not perform the work, closing the opening 130 can reduce diffusion of the VOC.

In addition, the lid portion 140 may be configured to be attachable to and detachable from the first cover 101.

In this case, for example, the VOC in the space covered with the first cover 101 may be removed by performing air intake for a predetermined period using the second fan 52 in a state where the lid portion 140 is attached to the first cover 101 (state where the opening 130 is closed). Then, the lid portion 140 may be detached to perform the maintenance work.

In addition, while the lid portion 140 is configured with the rectangular members 141 in this embodiment, the lid portion 140 is not limited thereto.

For example, the lid portion 140 may be configured to be formed with a pair of rubber members and fixed to the first cover 101 using a line fastener or a surface fastener.

Even with this configuration, the lid portion 140 can be displaced, and similar advantages as described above can be obtained.

3. Third Embodiment

Next, a third embodiment will be described.

Note that configurations identical to those in the first embodiment will be denoted by the same reference signs and redundant descriptions will be omitted.

Figure 7:
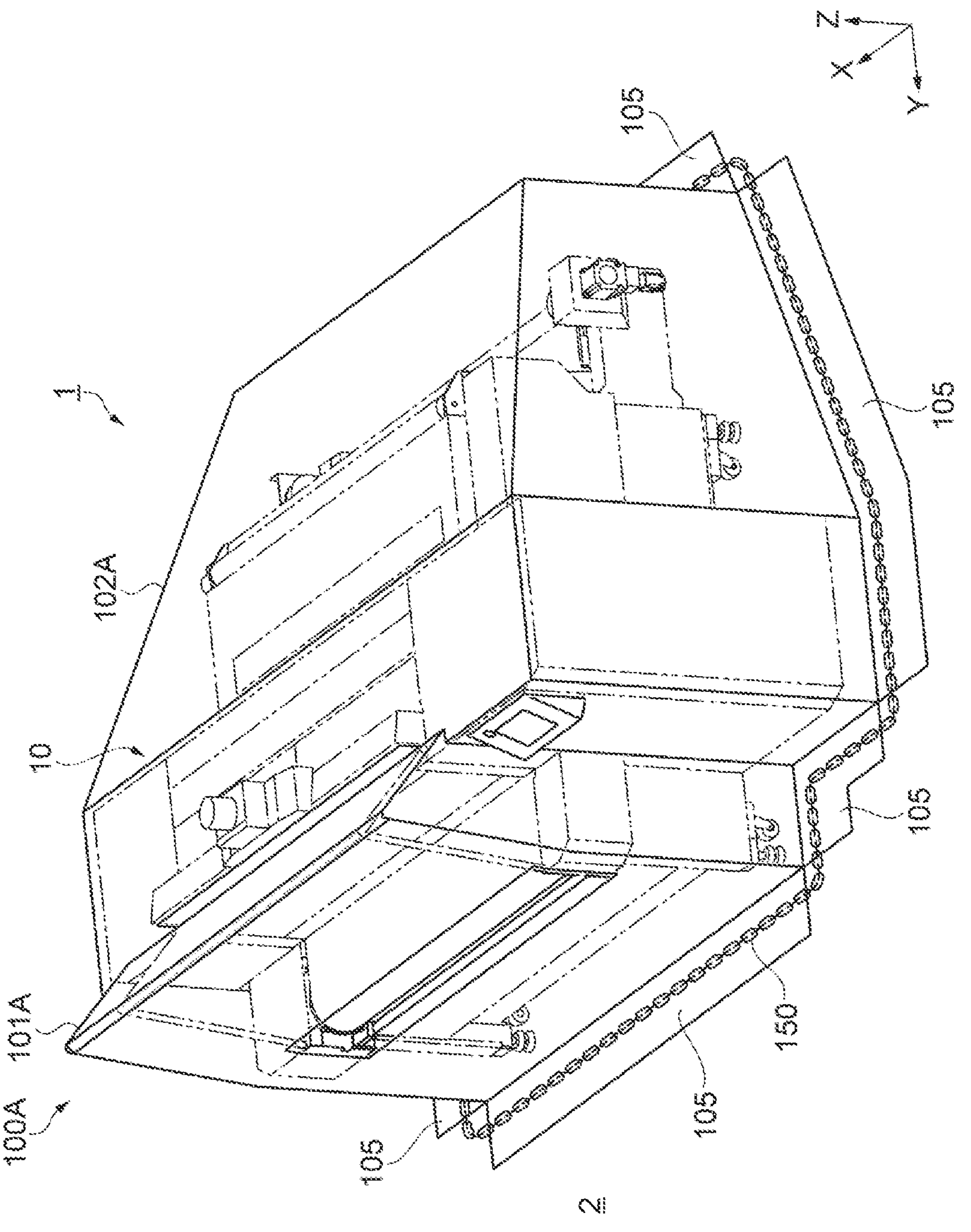
FIG. 7 is a perspective view illustrating a configuration of a work system according to a third embodiment.

In FIG. 7, the recording apparatus 10 is illustrated by chain double-dashed line, and a cover 100A is illustrated by solid line.

The cover 100A of this embodiment includes a first cover 101A and a second cover 102A.

The cover 100A (the first cover 101A and the second cover 102A) includes a contact portion 105 that is in contact with the installation surface 2 on which the recording apparatus 10 is installed.

As illustrated in FIG. 7, the contact portion 105 includes a contact surface that is in contact with the installation surface 2 and on which a bottom part in a lower portion of the cover 100A extends on the installation surface 2.

The contact portion 105 is disposed entirely around the cover 100A.

A pressing portion 150 that presses the contact portion 105 to the installation surface 2 is arranged.

The pressing portion 150 is a weight such as a chain. The pressing portion 150 is arranged across the entire contact portion 105 (entirely around the recording apparatus 10).

Accordingly, close contact between the installation surface 2 and the cover 100A can be improved.

Accordingly, airtightness of a space covered with the cover 100A is improved, and diffusion of the VOC from a gap in the lower portion of the cover 100A can be reduced.

For example, the pressing portion 150 may be a mechanism that applies a wind pressure to the contact portion 105.

Other configurations of the first cover 101A and the second cover 102A are the same as the configurations of the first embodiment.

4. Fourth Embodiment

Next, a fourth embodiment will be described.

Note that configurations identical to those in the first embodiment will be denoted by the same reference signs and redundant descriptions will be omitted.

Figure 8:
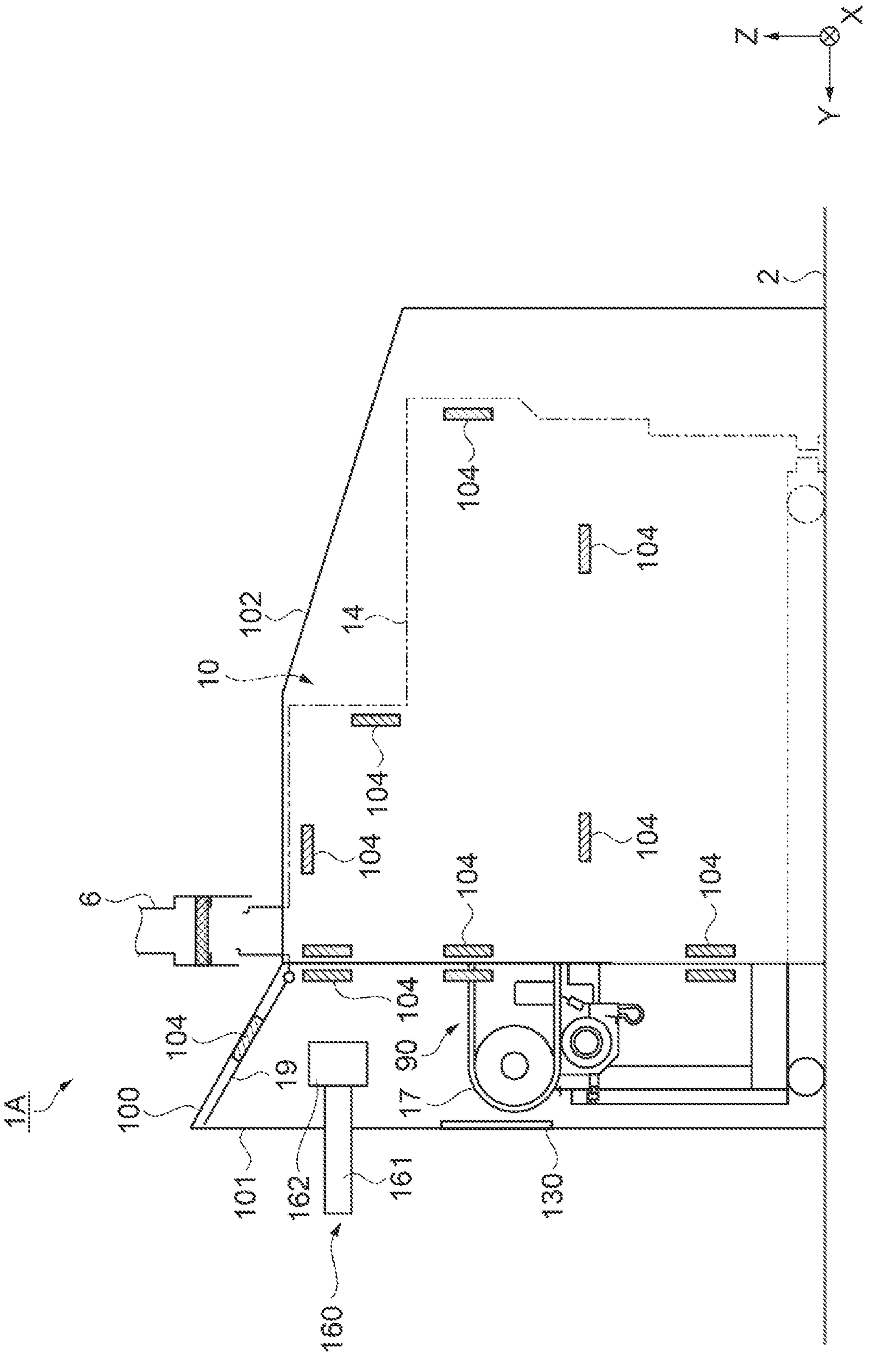
FIG. 8 is a side view illustrating a configuration of a work system according to a fourth embodiment.

In FIG. 8, a part of the recording apparatus 10 is illustrated by chain double-dashed line, and the cover 100 is illustrated by solid line.

As illustrated in FIG. 8, in a work system 1A of this embodiment, an outside air intake portion 160 that takes outside air into the space covered with the first cover 101 is disposed.

The outside air intake portion 160 includes a communication portion 161 that causes the space covered with the first cover 101 to communicate with the space outside the first cover 101, and a wind blowing portion 162 that blows air to the space covered with the first cover 101 through the communication portion 161.

The communication portion 161 is a pipe and is disposed to pass through the first cover 101.

The wind blowing portion 162 is a fan.

For example, power is supplied to the wind blowing portion 162 from a commercial power supply.

The wind blowing portion 162 may be arranged inside the space covered with the first cover 101 or may be arranged outside the first cover 101.

For example, the outside air intake portion 160 is arranged above the user performing the maintenance work.

By driving the wind blowing portion 162, outside air flows into the space covered with the first cover 101 through the communication portion 161.

Accordingly, retention of the VOC in the space covered with the first cover 101 is suppressed, and density of the VOC can be reduced in a short time period, compared to a configuration in which the outside air intake portion 160 is not disposed.

Accordingly, affecting the operation of the recording apparatus 10 can be further suppressed.

The power supply of the wind blowing portion 162 may be shared as a power supply of the recording apparatus 10.

Specifically, the wind blowing portion 162 is electrically coupled to the recording apparatus 10 through an electrical cable, and the recording apparatus 10 is coupled to the commercial power supply.

Accordingly, power is supplied to the wind blowing portion 162 through the recording apparatus 10.

In addition, the power supply of the wind blowing portion 162 may be a storage battery.

5. Fifth Embodiment

Next, a fifth embodiment will be described.

Note that configurations identical to those in the first embodiment will be denoted by the same reference signs and redundant descriptions will be omitted.

While the work system 1 is configured with the recording apparatus 10, the cover 100, and the removing portion in the first embodiment, all of the recording apparatus 10, the cover 100, and the removing portion may be configured as the recording apparatus 10.

That is, the recording apparatus 10 may include the transport belt 17 that is provided with an adhesive configured for attachment of a medium, and that can transport the medium M, the casing 14 in which the recording portion 20 that can perform recording on the medium M is accommodated, the cover 100 that covers at least a part of the exposed part 90 exposed from the casing 14 in the transport belt 17, and the removing portion (for example, the second fan 52) that can remove the gas in the space covered with the cover 100.

Even with this configuration, similar advantages as described above can be obtained.

What is claimed is:

1. A work system comprising:

a recording apparatus including:

a transport belt that is provided with an adhesive configured for attachment of a medium, and is configured to transport the medium; and a main body portion in which a recording portion configured to perform recording on the medium is accommodated;

a cover that covers at least a part of an exposed part of the transport belt exposed from the main body portion; and a removing portion configured to remove gas, along a positive height direction, from a space downstream of the recording portion to a space outside of the cover, wherein the adhesive includes a volatile organic compound, and the gas is evaporated from the volatile organic compound.

2. The work system according to claim 1, wherein the exposed part protrudes from the main body portion.

3. The work system according to claim 1, wherein the cover is detachably attached to the recording apparatus.

4. The work system according to claim 1, wherein the cover includes:

a plurality of frames disposed at intervals; and at least one stretching member stretched over the plurality of frames, electrical conductivity of the plurality of frames is greater than electrical conductivity of the at least one stretching member, and the plurality of frames are electrically coupled to the recording apparatus.

5. The work system according to claim 1, wherein the cover is provided with an opening and a lid portion provided at the opening, and the lid portion is configured to be displaced to a position at which the space communicates with a space outside the cover through the opening.

6. The work system according to claim 1, wherein the cover includes a contact portion that is in contact with an installation surface at which the recording apparatus is installed, and the work system includes a pressing portion that presses the contact portion to the installation surface.

7. The work system according to claim 1, wherein the cover is provided with a communication portion for communication between the space covered with the cover and a space outside the cover, and a wind blowing portion that blows air to the space through the communication portion.

8. A work system comprising:

a recording apparatus including:

a transport belt that is provided with an adhesive configured for attachment of a medium, and is configured to transport the medium; and a main body portion in which a recording portion configured to perform recording on the medium is accommodated;

a cover that covers at least a part of an exposed part of the transport belt exposed from the main body portion; and a removing portion configured to remove gas in a space covered with the cover, wherein the cover includes a plurality of frames disposed at intervals and at least one stretching member stretched over the plurality of frames, electrical conductivity of the plurality of frames is greater than electrical conductivity of the at least one stretching member, and the plurality of frames are electrically coupled to the recording apparatus.

9. The work system according to claim 8, wherein the exposed part protrudes from the main body portion.

10. The work system according to claim 8, wherein the cover is detachably attached to the recording apparatus.

11. The work system according to claim 8, wherein the cover is provided with an opening and a lid portion provided at the opening, and the lid portion is configured to be displaced to a position at which the space communicates with a space outside the cover through the opening.

12. The work system according to claim 8, wherein the cover includes a contact portion that is in contact with an installation surface at which the recording apparatus is installed, and the work system includes a pressing portion that presses the contact portion to the installation surface.

13. The work system according to claim 8, wherein the cover is provided with a communication portion for communication between the space covered with the cover and a space outside the cover, and a wind blowing portion that blows air to the space through the communication portion.

14. A recording apparatus comprising:

a transport belt that is provided with an adhesive configured for attachment of a medium, and is configured to transport the medium;

a main body portion in which a recording portion configured to perform recording on the medium is accommodated;

a cover that covers at least a part of an exposed part of the transport belt exposed from the main body portion; and a removing portion configured to remove gas, along a positive height direction, from a space downstream of the recording portion to a space outside of the cover, wherein the adhesive includes a volatile organic compound, and the gas is evaporated from the volatile organic compound.

15. A recording apparatus comprising:

a transport belt that is provided with an adhesive configured for attachment of a medium, and is configured to transport the medium;

a main body portion in which a recording portion configured to perform recording on the medium is accommodated;

a cover that covers at least a part of an exposed part of the transport belt exposed from the main body portion; and a removing portion configured to remove gas from a space covered with the cover, along a positive height direction, to a space outside of the cover, wherein the adhesive includes a volatile organic compound, and the gas is evaporated from the volatile organic compound.

* * * * *